United States Patent [19]

Hawker et al.

[11] 3,918,657

[45] Nov. 11, 1975

[54] TAPE REEL

[75] Inventors: Michael John Hawker, Tettenhall; Dennis Frederick Poole, Solihull, both of England

[73] Assignee: Rabone Chesterman Limited, Birmingham, England

[22] Filed: July 11, 1974

[21] Appl. No.: 487,641

[30] Foreign Application Priority Data

July 20, 1973 United Kingdom.............. 34696/73

[52] U.S. Cl................................... 242/84.8; 33/138

[51] Int. Cl.²...................... B65H 75/16; G01B 3/10

[58] Field of Search........... 242/84.8, 71.8 A, 107.2; 33/138

[56] References Cited

UNITED STATES PATENTS

| | | | |
|---|---|---|---|
| 1,790,103 | 1/1931 | La Follette | 33/138 |
| 3,443,316 | 5/1969 | Edgell | 33/138 |
| 3,774,308 | 11/1973 | Jurentkoff | 33/138 |

FOREIGN PATENTS OR APPLICATIONS

| | | | |
|---|---|---|---|
| 538,871 | 3/1922 | France | 33/138 |
| 2,519 | 12/1902 | United Kingdom | 33/138 |
| 686,042 | 1/1953 | United Kingdom | 242/84.8 |

*Primary Examiner*—Edward J. McCarthy

*Attorney, Agent, or Firm*—Darby & Darby

[57] ABSTRACT

A tape reel comprising a casing with a two component hub journalled in its centre, a tape being wound on the hub, the two components of the hub being telescopically interengaged so as to be useable for tape reels of different thicknesses for accomodating tapes of different widths.

3 Claims, 3 Drawing Figures

TAPE REEL

This invention relates to tape reels of the kind comprising a casing which contains a tape measure, the inner end of which is anchored to a hub journalled in the casing, the hub being furnished with a handle whereby the tape, when extended out through an opening in the casing, can be reeled in again to be wound upon the hub.

It is customary for the hub to be constructed of a size precisely to fit the casing for which it is intended. In order however to provide for a range of tape widths, there is at present an accompanying need to provide an equal number of hubs of differing widths.

It is the object of this invention to provide a hub for a tape reel of this kind which can be used for tape reels with tapes of different widths.

According to the present invention a tape reel of the kind specified, has a hub which comprises two axially telescopically inter-engageable components, securable together in a plurality of relative axially telescoped positions by fastening means.

Figure 1:
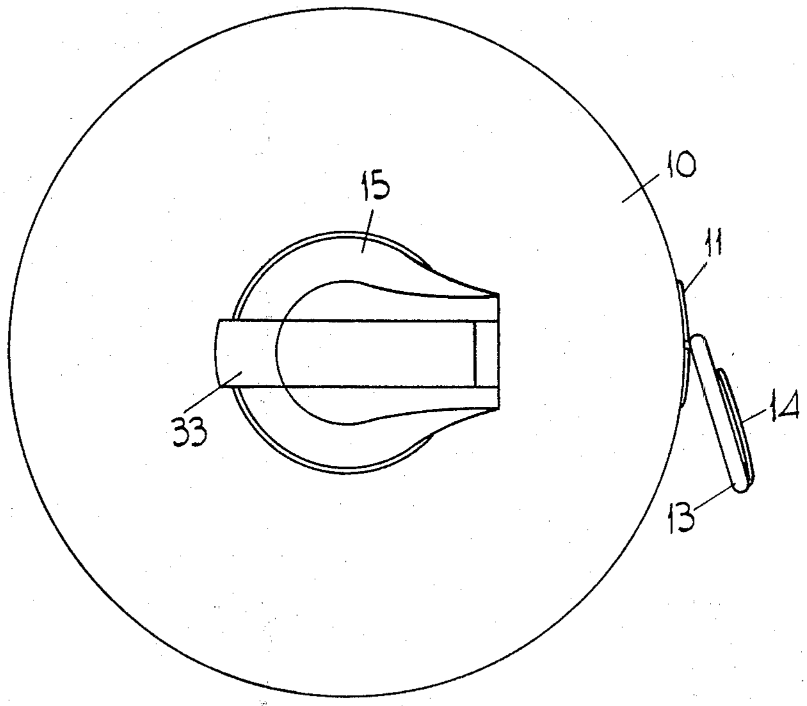
Figure 2:
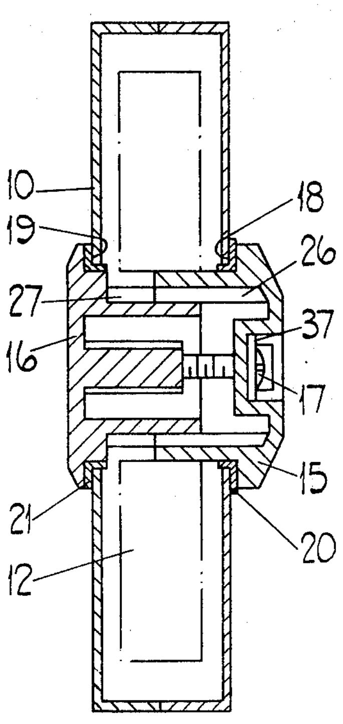
Figure 3:
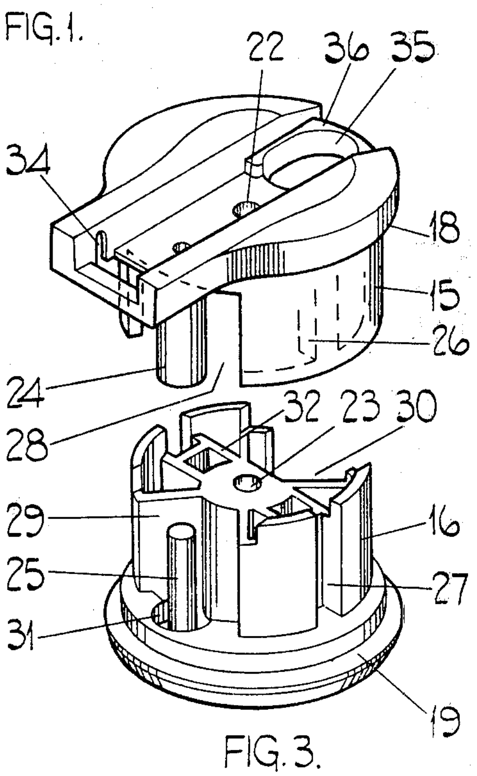

The invention will now be described by way of example with reference to the accompanying drawings in which:

FIG. 1 is a plan view of a tape reel constructed in accordance with the invention, FIG. 2 is a cross-sectional view thereof, and FIG. 3 is an expanded perspective view of the hub of the reel.

The reel illustrated comprises a shallow generally cylindrical casing 10. This is constructed in two halvds which abut together around the periphery of the casing. At one position on the periphery is an opening surrounded sy a frame 11 carrying a pair of rollers (not illustrated). Between the rollers and through the opening extends one end of a tape 12 which is wound upon a hub (to be described) occupying the centre of the casing. The end of the tape which extends through the opening carries a metal loop 13 on which is also hinged a flap 14. The flap can be extended at right angles to the loop and is furnished with teeth whereby it can engage and grip an edge from which a measurement is to be taken. This loop and flap arrangement is, however, conventional. Moreover alternative components may be substituted.

The tape 12 in its fully wound condition as shown occupies substantially the whole of the interior space defined within the casing and it may be pulled out to any desired extent simply by pulling upon the loop 13. The tape may be linen or it may be made from a more rigid material and is of course provided at intervals with markings whereby measurement can be carried out.

One side of the casing may be provided with a pair of diametrically opposite studs (not illustrated) near the edge of the casing respectively. On these studs is engaged a flexible handle extending across the centre of the casing. This handle may however be omitted from smaller tape reels such as that illustrated in the drawings.

The hub of the tape reel is constructed from two components 15 and 16. In this example, these components are moulded from plastics material. The components 15,16 are secured together by a single screw 17 and have respective internally presented annular shoulders 18,19 which are journalled on the sides of the casing 10 respectively, through respective thrust rings 20,21.

The screw 17 occupies a hole 22 in the centre of the component 15 and has its screw threaded end engaged in a hole 23 in the centre of the component 16. At a position off-set from the centre of the components 15,16 are elements 24,25 of a telescopic post. This telescopic post comprises the anchor for the inner end of the tape 12. To prevent relative rotation between the components 15,16 the former component 15 has a pair of diametrically opposite internal projections 26 engaging in respective axially extending external recesses 27 in the component 16. The component 15 has a peripheral skirt portion with a gap at 28. In the centre of the gap is the element 24 of the telescopic post. The component 16 also has a skirt portion which however has the recesses 27 as well as two deeper recesses 29,30, which are diametrically opposite and are equally spaced from the recesses 27. In one of these deep recesses 29, is the element 25 of the telescopic post and the latter is surrounded by a part-circular cut-out 31, which accommodates the tubular element 24 of the telescopic post which is on the other component 15.

The centre of the component 16 is provided with stiffening webs 32 which connect together the skirt portions adjacent to the recesses 27.

The skirt portions of the components 15,16 are telescopically engaged together and have internal and external engaging walls which taper slightly so that the components become wedged together upon full inter-engagement.

The portion of the component 16 which is exposed outside the casing 10, is merely a flat chamfered edged platform.

However, the portion of the component 15 which is outside the casing 10, forms a housing for a foldable handle 33. This handle is in the form of an elongated strip hinged at one end by means of a hinge pin (not illustrated) occupying a pair of hinge pin recesses 34 in the sides of a straight sided recess in the component 15. This straight sided recess has in the centre of its base, the hole 22 for the fixing screw 17. The end of the handle 33 remote from the hinge pin carries a knob (not illustrated) mounted upon a post which can be accommodated in a hole 35 also in the base of the recess. This knob can occupy the space allowed by the second larger recess in the component 16. Surrounding the hole 35 is a shoulder 36 which forms an abutment for the handle 33.

Secured by the fixing screw 17 and occupying the base of the straight sided recess is a blade spring 37 which engages with respective surfaces upon the handle 33 to spring load it into fully open or fully closed positions respectively.

The handle 33 has its extremity extending beyond the adjacent end of the straight sided recess in the component 15 so that access can be gained to it to allow it to be levered out to the open position, in which the knob extends upwards for easy rotation of the hub for winding in the tape.

The hub width is governed by the width of the casing and is telescopically inter-engaged to provide a hub for winding of the tape and also to provide a post for the inner end of the tape, the width of which suits the width of the tape.

We claim:

1. A tape reel comprising a casing, a hub having a post thereon journalled in the casing, said hub being of variable width and formed of two axially telescopically interengageable components, fastening means securing said two components together to fit the casing width, a tape measure contained within the casing having an inner end secured to the post on the hub, said components having respective telescopically engaged elements of the post on which the tape measure end is secured, a handle on the hub to rotate it to reel in the tape measure, and means on said two components for preventing relative rotation between them.

2. A tape reel as in claim 1 in which the two components of the hub have respective substantially annular skirt portions interrupted by said post, said skirt portions being telescopically interengageable and formations within the skirt portions to accept said fastening means.

3. A tape reel as claimed in claim 1 in which one of the components of the hub has a recess to accommodate the handle which is attached to it, the handle being retractable to a position partly enshrouded by the said hub component.

* * * * *